Dec. 13, 1955　　　　　J. O. CREEK　　　　　2,726,578
AUTOMATIC MACHINE TOOLS

Filed April 22, 1952　　　　　　　　　　　　　　5 Sheets-Sheet 1

INVENTOR
J. O. CREEK
PER

*Everett E. Waybee*

ATTORNEY.

Dec. 13, 1955    J. O. CREEK    2,726,578
AUTOMATIC MACHINE TOOLS
Filed April 22, 1952    5 Sheets-Sheet 2

INVENTOR
J. O. CREEK
PER

ATTORNEY

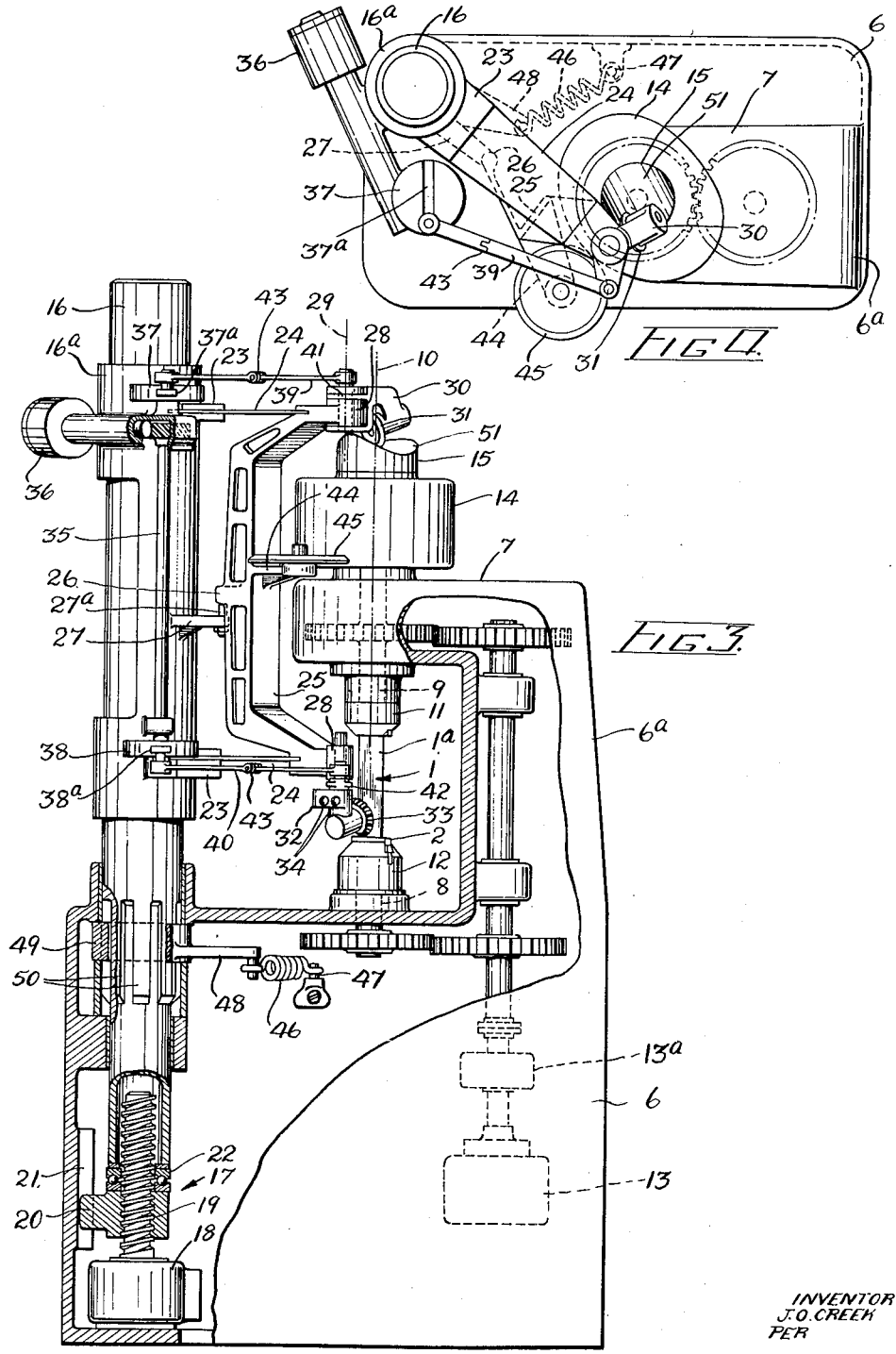

Dec. 13, 1955  J. O. CREEK  2,726,578
AUTOMATIC MACHINE TOOLS
Filed April 22, 1952  5 Sheets—Sheet 4

INVENTOR
J. O. CREEK
PER

ATTORNEY

United States Patent Office 2,726,578
Patented Dec. 13, 1955

2,726,578

AUTOMATIC MACHINE TOOLS

John Oliver Creek, Brampton, Ontario, Canada, assignor to A. V. Roe Canada Limited, Malton, Ontario, Canada, a corporation Application April 22, 1952, Serial No. 283,675

23 Claims. (Cl. 90—13)

This invention relates to automatic machine tools and is more particularly concerned with a machine tool, and a method, for machining on a workpiece a first surface and the junction between the first surface and a second surface which protrudes from or is inclined relative to the first surface.

A machine tool constructed in accordance with the present invention is especially useful for machining the blades of the turbines and compressors of gas turbine engines. These blades usually consist of a base or root from which protrudes a portion of cambered aerofoil section. The surface of the root from which the aerofoil portion protrudes may be concave or convex, and the aerofoil portion is blended by a fillet into the said surface of the root. With known machine tools, the machining of a workpiece of this complex configuration cannot easily be performed in a rapid, accurate and economical manner. For example, the surface of the root from which the aerofoil portion protrudes can be only partly shaped by standard machine motions and it is then necessary to finish the root surface by hand work. The formation of the fillet by a small pencil-like cutter is also unsatisfactory. Such cutters are uneconomical to use, and they do not produce a surface finish of a high standard.

The main object of the present invention is, therefore, to provide a machine tool and method for shaping such workpieces automatically to a predetermined form in an economical and accurate manner.

Another object of the invention is to provide a machine tool and method enabling a cutter or other machining element of relatively large diameter to be utilized for machining the surface of a root and fillet; a large diameter machining element has the advantages of a large peripheral machining surface and good stability.

The above and further objects and advantages of the invention will be understood from the following description of some embodiments of the invention illustrated in the accompanying drawings, in which:

Figure 3 is an elevation, partly in section, of a single spindle machine tool constructed in accordance with the invention;

Figure 4 is a plan of the machine tool illustrated in Figure 3;

Figure 1:
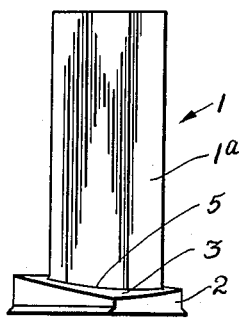
Figure 1 is a front elevation of a typical gas turbine engine compressor blade.
Figure 2:
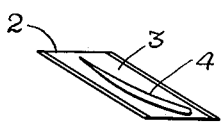
Figure 2 is a plan of the said blade.
Figure 5:
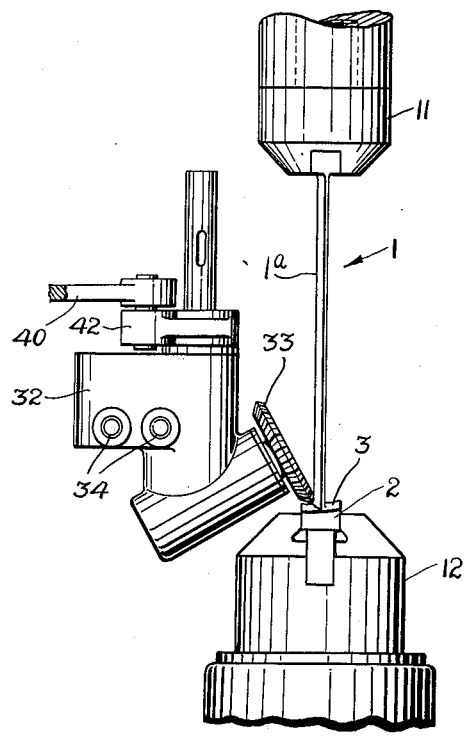
Figure 5 is a broken-away enlarged elevation of the oscillating machining unit of the machine tool illustrated in Figures 3 and 4, with the rotary cutter of the unit in contact with the upper root surface of the compressor blade illustrated in Figures 1 and 2.

By reference first to Figures 1 and 2, it will be seen that a typical blade 1 for a gas turbine engine has a base or root 2 from the upper surface 3 of which an aerofoil portion 1a protrudes. In a stator blade, such as the one illustrated, the upper surface 3 of the root is concave; in a rotor blade, the upper surface 3 is convex. The aerofoil portion 1a has a concave face 4 and blends into the surface 3 by a fillet 5. A machine tool constructed in accordance with the present invention is adapted to machine automatically workpieces of this complex configuration to a finished form, and in particular is adapted to machine the fillet 5 and surface 3 of the root 2; a considerable saving of time and money is thereby effected in the manufacture of such workpieces.

The machine tool illustrated in Figures 3 to 7 is particularly adapted to finish-machine blade forgings which in previous operations have ben rough-machined. The machine tool has a housing or base 6, and extending vertically from the base is a hollow support 6a having a horizontal arm 7. The single spindle of the machine tool consists of a lower workshaft 8 and an upper workshaft 9 rotatably mounted in the base 6 and in the horizontal arm 7 respectively, the said workshafts being arranged on a common hypothetical vertical axis 10. The upper workshaft 9 carries a removable chuck 11 which is adapted to support the tip of a blade 1. A removable chuck 12 is likewise carried by the lower workshaft 8, the said chuck 12 being adapted to support the root 2 of the blade 1. At least one of the workshafts 8 and 9 is driven to rotate the blade 1 about the axis 10, whereas the other workshaft may be mounted for free rotation or may be synchronously driven; when the blade is a long slender one, it is advisable to drive from both ends, as illustrated, in order to reduce strain. The drive for the workshafts 8 and 9 is an anti-backlash gear train arranged and housed in the base 6 and in the hollow support 6a. Power for the drive is furnished by a variable speed hydraulic motor 13 connected to the gear train through a speed reducer 13a. An aerofoil pattern 14 and a root pattern 15, hereinafter described, are coaxially mounted at the upper end of the upper workshaft 9, and rotate synchronously therewith.

An upright hollow column 16, on which is rigidly secured a carrier 16a, is vertically slidable and free to rotate in the base 6. The column may be moved vertically by means of a drive 17 in the base. The drive is powered by a motor 18 which rotates a lead screw 19. The lead screw threadably engages a vertically movable slider 20 which is prevented from rotating by guides 21 secured to the base 6. The column 16 is supported on the slider 20 by a bearing 22 which permits rotation of the column relative to the slider.

On the carrier 16a are two lugs 23, 23 from which extend horizontally disposed leaf springs 24, 24. The springs 24, 24 support a yoke 25 and permit limited vertical movement of the yoke relative to the column 16. Also, as will be seen hereinafter, the springs 24, 24 assist in transmitting rotative forces from the yoke 25 to the column 16. The vertical movement of the yoke relative to the column is limited in a downward direction by a stop 26, adapted to engage an abutment 27a which is adjustably mounted on an arm 27 on the carrier 16a.

Bearings 28, 28 are provided in the upper and lower ends of the yoke, the bearings having a common vertical axis 29. In the upper bearing is pivotally mounted a root follower unit 30 having a root follower wheel 31, and in the lower bearing is pivotally mounted a machining unit 32 having a rotary machining element, such as a disc-like cutter 33, powered by a hydraulic motor contained in the unit. The motor is fed by flexible leads (not shown) connected to terminals 34 on the machining unit. The profile of the peripheral machining surface of the cutter 33 is complementary to the desired configuration of the fillet 5.

A vertical crankshaft 35 is journalled on the carrier 16a, the crankshaft being driven by a motor 36 also mounted on the carrier. Identical cranks 37 and 38, located at the upper and lower ends respectively of the crankshaft, are connected by rods 39 and 40 to pivot-arms 41 and 42 of the units 30 and 32 respectively, whereby synchronous oscillation of the units 30 and 32 about the common axis 29 is achieved. The connecting rods each consist of two portions hinged together as at 43 to permit vertical movement of the yoke 25 relative to the column 16. Slots 37a and 38a are provided in the cranks 37 and 38 respectively so that the points of connection of the connecting rods to the cranks can be varied, thus varying the lengths of the effective crank arms and therefore varying the amplitudes of oscillation of the follower wheel 31 and the cutter 33.

The yoke 25 has a horizontal arm 44 in which an aerofoil follower wheel 45 is journalled, the wheel being free to rotate against the aerofoil pattern 14. The wheel is maintained in contact with the peripheral surface of the aerofoil pattern 14 by means of a spring 46 in the base 6. The spring 46 is secured at one end to an anchor post 47 on the base and is secured at its other end to a lug 48 carried by a sleeve 49 on the column 16. Splines 50 on the column permit vertical movement of the column relative to the sleeve but prevent relative rotary movement of the column and sleeve. Thus the spring 46 urges the column 16 about its axis in a counterclockwise direction (when regarded from above), and the column, through the springs 24, carries the yoke in this direction and thus holds the aerofoil follower wheel 45 against the pattern 14. With the aerofoil follower wheel 45 held in contact with the peripheral surface of the aerofoil pattern 14, the aerofoil pattern controls horizontal movement of the yoke, and hence controls horizontal movement of the root follower wheel 31 and the rotary cutter 33. The peripheral surface of the pattern 14 is designed to control the horizontal approach of the cutter 33 to the aerofoil portion 1a of the workpiece, and the pattern 14 and follower wheel 45 thus constitute a profile control determinative of the desired profile of the aerofoil portion 1a.

For the moment let it be assumed that the drive 17 is not in operation, so that there is no axial movement of the column 16, the column being in such a position vertically that the root follower wheel 31 rests on the upper end surface 51 of the root pattern 15. This upper end surface has a contour corresponding to that which it is desired to machine on the upper surface 3 of the root 2; for example, for machining the particular blade illustrated in Figures 1 and 2, the surface 51 of the pattern 15 is generally concave. The root follower wheel 31 and the pattern 15 are thus determinative of the desired contour of the surface 3, and they constitute a contour control for the machining unit, controlling vertical movement of the rotary cutter 33.

Interchangeable root follower wheels 31 and rotary cutters 33 may be provided, and the follower wheel used should of course correspond in shape and size with whatever rotary cutter is used. For accurate machining, the rotary cutter 33 and the root follower wheel 31 should have the same relative positions and inclinations with respect to the axis 29 about which they oscillate. As an example only, in Figure 5 the axis of rotation of the rotary cutter 33 and therefore also of the root follower wheel 31 is at an angle of approximately 30 degrees to the horizontal; the inclination of the cutter makes it possible to use a rotary cutter of relatively large diameter to machine the fillet 5 on the concave face 4 of the blade 1.

In operation, the root follower unit 30 and the machining unit 32 are oscillated about the axis 29 by the crankshaft 35 so that the root follower wheel 31 scans the upper end surface 51 of the root pattern 15 and the rotary cutter 33 scans the upper surface 3 of the root 2 in a curved path 52 (Figures 6 and 7); thus, the rotary cutter can machine the entire surface 3 right up to the fillet 5 at the base of the concave face 4. The rotation of the workpiece 1 on the workshafts 8, 9 brings different parts of the surface 3 and fillet 5 into the path of the cutter. It will be observed that whatever means are provided for oscillating the machining element in the desired path, these oscillating means control the orientation of the machining unit to the workpiece.

Since the rotary cutter 33 oscillates about the axis 29, its effective cutting path 52 is that of a larger cutter of radius R (Figures 6 and 7); it is necessary, during the rotation of the blade 1, that the pivotal axis 29 be displaced, relative to the axis of rotation 10 of the blade, in such a manner that the path 52 of the cutter just touches the required profile of the blade 1 at any angular position of the blade so that the machining surface of the cutter is tangential to the blade profile at the point of contact. This result is brought about by the aerofoil pattern 14 and the aerofoil follower wheel 45, which constitute the aerofoil profile control, and by the oscillating means which constitute an orientation control, these controls varying the attitude of the cutter to the workpiece in such a way as to have the cutting surface always substantially tangential to the surface 1a at the junction 5 when the junction is being machined.

The paths of the rotary cutter 33 and of the root follower wheel 31 are identical and hence, as the root follower wheel moves over the surface 51 of the pattern 15, the yoke 25 and the machining unit 32 are displaced vertically in accordance with variations in the contour of the surface 51. The rotary cutter 33 is consequently guided to machine the upper surface 3 of the root 2 to a contour determined by the configuration of the surface 51 of the pattern 15. Obviously the number of oscillations per minute of the units 30 and 32 must be much greater than the R. P. M. of the workspindle.

A machining operation is normally begun with the column 16 raised vertically above the position shown in Figure 3, the root follower wheel 31 being out of contact with the end surface 51 of the pattern 15. The height of the aerofoil pattern 14 corresponds to the axial length of the aerofoil portion 1a, and the configuration of the aerofoil pattern is such as to guide the rotary cutter 33 to machine the profile of the aerofoil portion as the workspindle rotates and as the machining unit 32 oscillates. Starting near the top of the blade, the cutter is moved down the blade by the drive 17, to machine the aerofoil portion 1a, until the rotary cutter is about to contact the upper surface of the root 2, at which time the follower wheel 31 contacts the surface 51 of the pattern 15. The machining of the surface 3 of the root 2 and the fillet 5 is then performed under the combined control of the root follower wheel 31 rolling on the surface 51 of the pattern 15 and the aerofoil follower wheel 45 rolling on the surface of the aerofoil pattern 14. It will be seen that the spring 46, by urging the follower 45 against the pattern 14, serves as positioning means for locating the machining element where it is adapted to contact the workpiece to machine the fillet 5.

By incorporating suitable electrical and hydraulic controls, in accordance with known machine tool practice, the machining cycle may be rendered fully automatic.

Figure 8:
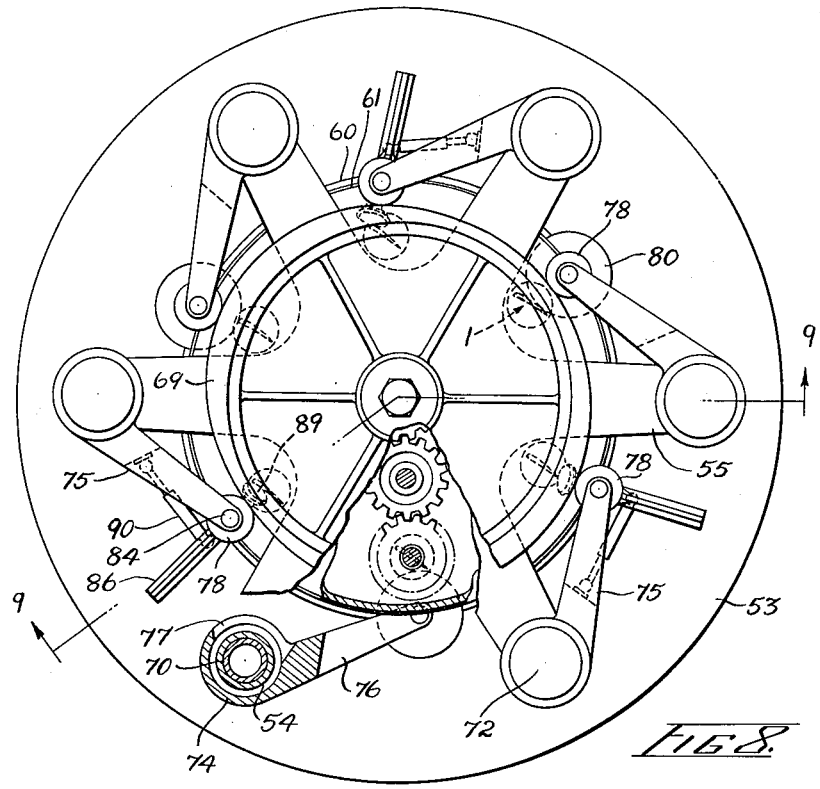
Figure 8 is a plan, partly in section, of a multi-spindle machine tool constructed in accordance with the invention.
Figure 6:
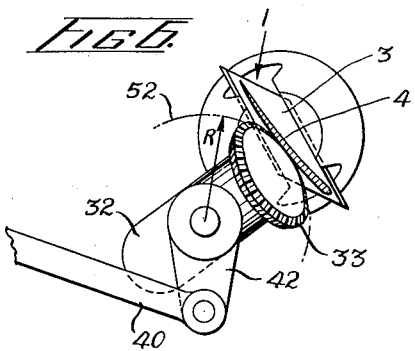
Figure 6 is a fragmentary plan of the machining unit illustrated in Figure 5, showing one relative position of the rotary cutter and the blade.
Figure 7:
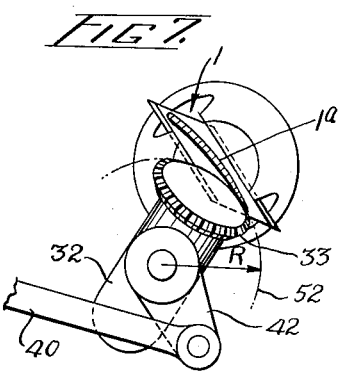
Figure 7 is a fragmentary plan similar to Figure 6 but showing another relative position of the rotary cutter and the blade.
Figure 9:
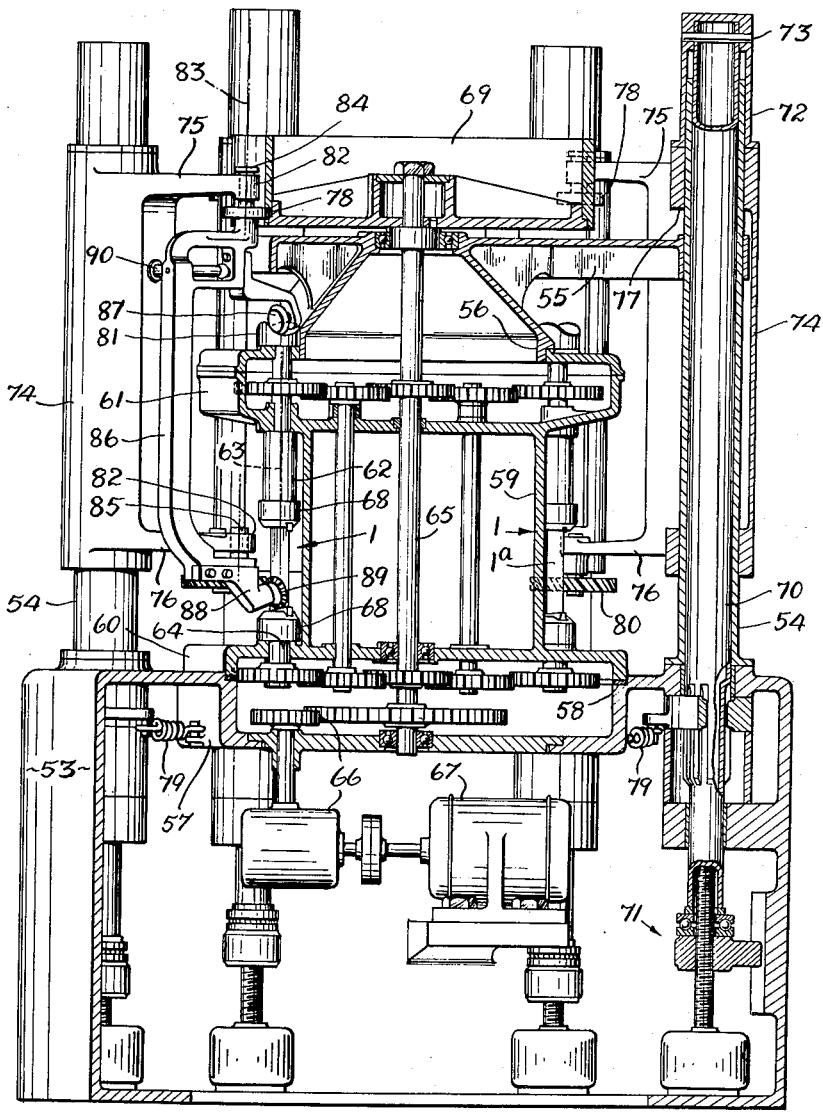
Figure 9 is a section taken on a vertical plane passing through the line 9—9 in Figure 8.

In Figs. 8 and 9 is shown a multi-spindle machine tool having a base 53 and a plurality of vertically disposed sleeves 54 arranged in a circle on the base and rigidly secured thereto. The machine tool illustrated has six spindles and six sleeves 54. The sleeves support the legs of a spider 55, and the hub of the spider has a depending rim 56. In its upper surface, the base 53 has a well 57 having a peripheral rim 58. Between the base 53 and the spider 55, a vertically disposed hub 59 is rotatably mounted, the hub having at its lower end an integral table 60 rotatable on the stationary rim 58, and having at its upper end a flange 61 rotatable on the stationary rim 56.

Six workshafts 62 are journalled in the flange 61 and have common vertical axes 63 with six similar workshafts 64 journalled in the table 60. Each pair of coaxial workshafts constitute a workspindle, and the workspindles are equally spaced in a circle around the hub 59. The workshafts are synchronously driven by gears from a central vertical shaft 65 which is driven through reduction gearing 66 by a motor 67 mounted in the base 53. Chucks 68 on the workshafts hold the blades 1 which are to be machined.

Secured to the upper end of the central shaft 65 is an aerofoil pattern 69. The aerofoil pattern makes one revolution for every revolution of the blades 1.

Rotatably and slidably mounted in each sleeve 54 is a vertical, cylindrical, hollow column 70, each column being rotatably and slidably mounted, relative to the base 53, on a drive 71 in the base similar to the drive 17 shown in Figure 3. The upper end of each column extends beyond its sleeve 54, and a cap 72 is secured to said upper end by a pin 73. The cap supports a carrier 74 which is slidable and rotatable on the outer surface of the sleeve 54; the carrier has an upper horizontal arm 75 and a lower horizontal arm 76, and is cut away as at 77 so as not to interfere with the legs of the stationary spider 55.

Each carrier 74 supports a machining element, and thus a plurality of machining stations is provided on the base, and to these machining stations blades supported by the workspindles can be moved by rotation of the hub 59. At three of the machining stations, equally spaced around the hub from each other, such as the station shown at the right-hand side of Figure 9, the aerofoil portion 1a of a blade 1 is machined, and these stations will therefore be designated as aerofoil portion machining stations; at the three other stations such as the one illustrated at the left-hand side of Figure 9, the upper root surface 3 and the fillet 5 of a blade are machined, and these stations will be designated as root machining stations. At every station, the carrier 74 carries, on its upper arm, an aerofoil follower wheel 78, the wheel being urged into contact with the peripheral surface of the aerofoil pattern 69 by a spring 79, similar to the spring 46 shown in Figure 3, tending to rotate the column 70 and the carrier 74.

At the aerofoil portion machining stations, such as the one shown at the right-hand side of Figure 9, the upper arm 75 of the carrier simply carries the aerofoil follower wheel 78 rolling on the periphery of the aerofoil pattern 69, whilst the lower arm 76 supports a horizontally disposed rotary cutter 80 adapted to machine the aerofoil portion 1a of the blade 1. As the blade is rotated by the workspindle, the rotary cutter 80 is guided to machine the desired profile of the aerofoil portion 1a by the aerofoil pattern 69 acting on the aerofoil follower wheel 78, and the drive 71 moves the cutter in the direction parallel to the workspindle axis.

At the root machining stations, such as the one illustrated at the left-hand side of Figure 9, a more complicated mechanism is employed to machine the upper root surface 3 and the fillet 5 of a blade 1. This mechanism operates on the same principle as that described with reference to Figure 3, but the detailed construction is somewhat different. A root pattern 81, corresponding in shape to the desired contour of the upper surface 3 of the root, is detachably mounted on and driven by the upper end of each upper workshaft 62. However, the patterns 81 come into operation at only the three root machining stations. At these stations the horizontal arms 75 and 76 of the carrier 74 are each provided at the end with a bearing 82, the bearings of each pair of arms having a common vertical axis 83. Upper and lower trunnions 84 and 85 respectively of a yoke 86 are pivotally and axially slidably mounted in these bearings. Coaxially mounted on the upper trunnion 84 is the aerofoil follower wheel 78 which rolls on the aerofoil pattern 69.

A root follower wheel 87 is mounted in a bearing at the upper part of the yoke 86, and rolls on the surface of the root pattern 81 carried by the upper workshaft 62 of the workspindle at the time being presented to a root machining station. A machining unit 88 having a rotary cutter 89 is secured to the lower portion of the yoke 86. The machining unit has a self-contained hydraulic driving motor for the rotary cutter. The root follower wheel 87 and the rotary cutter 89 should have the same relative positions and inclinations to the pivotal axis 83 of the yoke 86. To oscillate the machining unit 88 so that the cutter 89 traverses the upper root surface 3 of the blade, the yoke 86 is oscillated about the axis 83 by means, for example, of a hydraulic cylinder and piston assembly 90 connected by ball joints between the carrier 74 and the yoke.

The operation of the machine tool at the root machining stations is substantially the same as the operation of the machine tool illustrated in Figure 3. However, in the multispindle machine tool movement of the machining unit 88 parallel to the axis 63 of a workspindle for machining of the upper surface 3 is obtained by a sliding motion of the trunnions 84 and 85 in the bearings 82. The machining unit is guided horizontally to follow the profile of the aerofoil portion of the blade by means of the aerofoil follower wheel 78 rolling on the surface of the aerofoil pattern 69.

The workpieces used in this multi-spindle machine tool may be blanks of bar stock with the sides and bottom of the root 2 already machined by a prior operation. Preliminary roughing cuts are made on each blank at one of the aerofoil portion machining stations and the blank is then moved, by rotation of the hub 59, to an adjacent root machining station where the upper surface 3 of the root 2 and the fillet 5 of the blade are machined. For finish-machining, the blank is then moved successively to the other aerofoil portion machining stations and root machining stations. By using suitable electric and hydraulic controls, in accordance with known machine tool practice, a blade may thus be finish-machined from a blank in one pass through this multi-spindle machine tool, since roughing to finishing can be effected on an automatic cycle with only one mounting of the blank in a workspindle.

Figure 10:
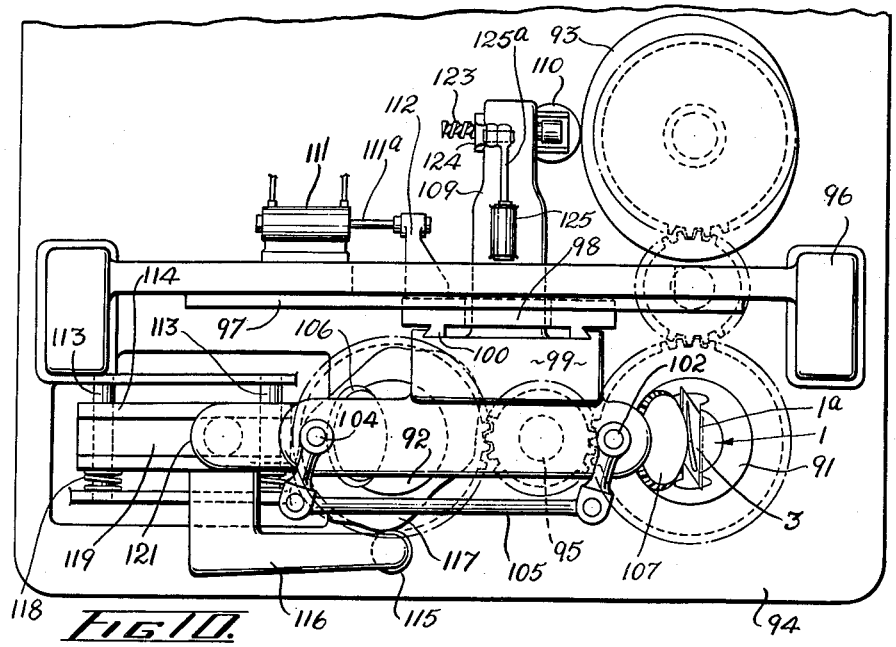
Figure 10 is a fragmentary plan of another single spindle machine tool constructed in accordance with the invention.
Figure 11:
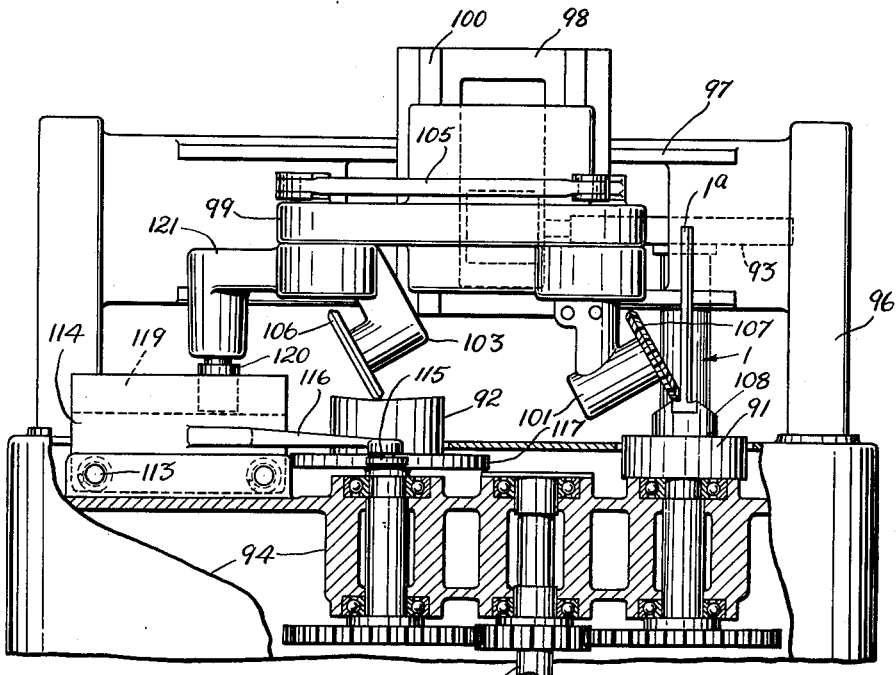
Figure 11 is a fragmentary elevation, partly in section, of the machine tool illustrated in Figure 10.

In another single spindle milling machine tool constructed according to the invention and illustrated in Figures 10 and 11, a workspindle 91, a root pattern 92 and an aerofoil pattern 93 are rotatable on parallel axes on a base 94, and are synchronously driven by gearing from a drive shaft 95. Mounted on the base 94 is a standard 96 having a horizontal slideway 97 which supports a carrier 98. A yoke 99 is supported on vertical slideways 100 on the carrier. A machining unit 101 is pivotally mounted on the yoke adjacent the workspindle 91 by means of a trunnion 102, and a root follower unit 103 is similarly pivotally mounted on the yoke adjacent the pattern 92 by means of a trunnion 104. The trunnions 102 and 104 are coupled together by a linkage 105 for synchronous pivotal movement of the units 101 and 103. The root follower wheel 106 of the root follower unit rolls on the upper cam surface of the pattern 92, thus moving the yoke 99 in a vertical direction on the slideways 100 and imparting synchronous vertical movement to the rotary cutter 107 of the unit 101 to machine the upper surface 3 of a blade 1 held in a chuck 108 on the workspindle 91. For horizontal movement of the cutter 107 relative to the blade, the yoke 99 has a horizontal arm 109 which carries an aerofoil follower wheel 110 running on the peripheral surface of the aerofoil pattern 93. An hydraulic cylinder 111 has a piston 111a acting on a lug 112 on the carrier 98 to maintain the aerofoil follower wheel 110 in contact with the aerofoil pattern 93.

Secured to the base 94 is a pair of slideways 113 on which a carriage 114 is mounted, the carriage being slidable on the slideways in a horizontal plane in a direction normal to a line joining the pivotal axes of the trunnions 102 and 104. An orientation follower wheel 115, supported by an arm 116 of the carriage, rolls on the periphery of an orientation pattern 117 which rotates on the same shaft as the pattern 92. The orientation follower wheel 115 is maintained in contact with the orientation pattern 117 by springs 118 acting between the base 94 and the carriage 114. The carriage 114 has a longitudinal slot 119 which is parallel to a line joining the pivotal axes of the trunnions 102 and 104. The carriage engages a trunnion block 120 having a vertical axis of rotation and supported in the slot 119 by a lug 121 secured to the root follower unit 103. Therefore, as the orientation pattern 117 rotates in synchronism with the pattern 92 and with the workspindle 91 and the workpiece 1, the carriage 114 is caused to slide on the slideways 113, the lug 121 pivots the root follower unit 103 on the trunnion 104, and the linkage 105 transmits synchronous pivotal movement to the machining unit 101 causing it to oscillate relative to the workpiece. Thus, oscillation of the machining unit 101 is dependent upon the rotation of the orientation pattern 117 in synchronism with the workspindle; in the embodiments previously described, the oscillations of the machining unit are normally of constant amplitude and period and are independent of the rotary motion of the workspindles. The orientation pattern 117 and the aerofoil pattern 93 are designed to maintain the rotary cutter 107 constantly tangential to the profile of the aerofoil portion 1a of the blade 1, for all angular positions of the workspindle 91. Thus, unlike the rotary cutters in the previously described embodiments, the rotary cutter 107 is not oscillated to traverse the entire area of the upper surface 3 of the root 2, but it is merely oscillated sufficiently to maintain it constantly tangential to the aerofoil portion 1a.

In order to machine the entire area of the upper surface of the root, means are provided to feed the cutter steadily toward the aerofoil portion 1a during the rotation of the workspindle 91. These means consist of a lead screw 123, which supports the aerofoil follower wheel 110 on the yoke arm 109, and a crank 124 for turning the lead screw to move the yoke arm 109 towards or away from the aerofoil pattern 93, the aerofoil follower wheel being always in contact with the aerofoil pattern due to the action of the piston 111a. An hydraulic cylinder 125 having a piston 125a is used to turn the crank 124; in the position shown, the yoke arm is in its closest position to the aerofoil patern 93, so that the cutter 107 is machining the fillet 5 of the blade. It will be seen that the cylinder 125 thus serves the purpose of the springs 46 and 79 in the embodiments previously described, acting as positioning means for locating the workpiece to machine the junction between the surfaces 1a and 3.

Apart from the different type of oscillatory motion imparted to the cutter, this embodiment of the invention operates in a similar manner to the embodiments previously described, the follower wheels 106 and 110 being influenced by the patterns 92 and 93 respectively to provide the necessary control of the position of the cutter relative to the workspindle.

Figure 12:
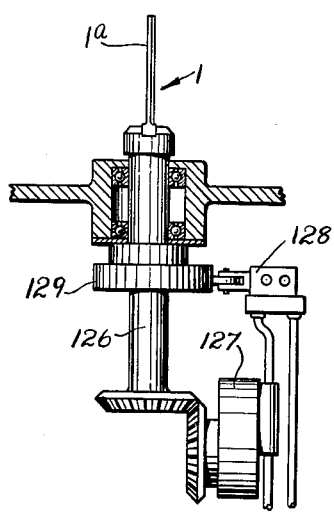
Figure 12 is a fragmentary elevation of a variable speed drive for the workspindle of the machine tool illustrated in Figures 10 and 11.

When machining a workpiece, such as the blade illustrated in Figures 1 and 2, the profile of the protruding portion of which is of cambered aerofoil section, if the workspindle 91 rotates at constant speed the cutter 107 is in contact for only a short time with points along the concave face 4 and the convex face of the blade, but it is in contact with the leading and trailing edges of the blade for a much longer time. In order to maintain the desired orientation of the rotary cutter to the concave or convex face of the blade from one end of the face to the other, it is necessary to pivot the cutter through a substantial arc during a small angular movement of the workspindle. In accordance with this invention, to obtain a uniform cutting action of the rotary cutter, when machining a workpiece the profile of the protruding portion of which is of such a shape as to necessitate a large displacement of the rotary cutter during only a small angular movement of the workspindle, means may be provided to vary the speed of rotation of the workspindle. A suitable construction is shown diagrammatically in Figure 12. The workspindle 126 and the patterns are driven by a hydraulic motor 127, the speed of rotation of which is varied by a control valve 128 controlled by a cam 129 on the workspindle. The profile of the cam 129 is designed to vary the speed of rotation of the workspindle in accordance with the shape of that part of the profile of the aerofoil portion 1a which is, at the time, adjacent the rotary cutter. An important feature of the cutters 33, 89 and 107 is their large diameters relative to the size of the fillet 5. Small pencil-like cutters or end cutters as conventionally used tend to overheat and become blunt, and it has heretofore been necessary to finish the platform 3 and fillet 5 by hand; the peripheral type cutters which machine tools constructed according to the invention are adapted to use have long life and provide excellent finished surfaces.

It is thought that the construction and use of the invention will be apparent from the above description of the various parts and their purpose. It is to be understood that the forms of the invention herewith shown and described are to be taken as preferred examples of the same and that various changes in the shape, size and arrangement of parts may be resorted to, without departing from the spirit of the invention or the scope of the subjoined claims.

What I claim as my invention is:

1. A machine tool for machining on a workpiece a first surface and the junction between the first surface and a second surface which is inclined relative to the first surface, comprising a support for the workpiece; a second support; a rotary disc-like machining element having a peripheral machining surface complementary to the desired configuration of the junction between the first and second surfaces, the machining element being mounted on the second support and movable over the first surface; a drive for imparting movement to the supports relative to each other; and control means for positioning the machining element and the workpiece relative to each other, said means comprising positioning means for locating the machining element and the workpiece with the machining surface of the machining element adapted to contact said junction, a profile control determinative of the profile of the second surface for guiding the machining element and the workpiece relative to each other for machining said junction, and an orientation control for oscillating the machining element and the workpiece relative to each other, the profile control and the orientation control maintaining the machining surface substantially tangential to the second surface at the junction when machining the junction.

2. A machine tool for machining on a workpiece a first surface and the junction between the first surface and a second surface which is inclined relative to the first surface, comprising a rotary disc-like machining element having a peripheral machining surface complementary to the desired configuration of the junction between the first and second surfaces; means supporting the workpiece and the machining element in operative relationship and including a workspindle for continuously rotating the workpiece in a predetermined sense of rotation and a support permitting movement of the machining element and the workpiece relative to each other in a direction substantially parallel to the axis of rotation of the workspindle and also in another direction; a contour control for guiding the machining element and the workpiece relative to each other in the direction substantially parallel to the axis of rotation of the workspindle and including a pattern determinative of the desired contour of the first surface and a tracer controlled by the pattern; positioning means for locating the machining element and the workpiece with the machining element adapted to contact said junction; a profile control determinative of the profile of the second surface for guiding the machining element and the workpiece relative to each other in said other direction for machining said junction; and an orientation control for oscillating the machining element and the workpiece relative to each other, the profile control and the orientation control maintaining the machining surface substantially tangential to the second surface at the junction when machining the junction.

3. A machine tool for machining on a workpiece a first surface and the junction between the first surface and a second surface which is inclined relative to the first surface, comprising a rotary disc-like machining element having a peripheral machining surface complementary to the desired configuration of the junction between the first and second surfaces; means supporting the workpiece and the machining element in operative relationship and including a workspindle for continuously rotating the workpiece in a predetermined sense of rotation and a support permitting movement of the machining element and the workpiece relative to each other in a direction substantially parallel to the axis of rotation of the workspindle and also in another direction substantially normal to the axis of rotation of the workspindle, the rotary machining element having its axis of rotation inclined to the two said directions; a contour control for guiding the machining element and the workpiece relative to each other in the direction substantially parallel to the axis of rotation of the workspindle and including a pattern rotated synchronously with the workspindle and determinative of the desired contour of the first surface and a follower cooperating with the pattern; positioning means for locating the machining element and the workpiece with the machining element adapted to contact said junction; a profile control determinative of the profile of the second surface for guiding the machining element and the workpiece relative to each other in said other direction for machining said junction; and an orientation control for synchronously oscillating the follower and the machining element relative to the pattern and the workpiece respectively, the profile control and the orientation control maintaining the machining surface substantially tangential to the second surface at the junction when machining the junction.

4. A machine tool for machining on a workpiece a first surface and the junction between the first surface and a second surface which is inclined relative to the first surface, comprising a rotary disk-like machining element having a peripheral machining surface complementary to the desired configuration of the junction between the first and second surfaces; means supporting the workpiece and the machining element in operative relationship and including a workspindle for continuously rotating the workpiece in a predetermined sense of rotation and a support permitting movement of the machining element and the workpiece relative to each other in a direction substantially parallel to the axis of rotation of the workspindle and also in another direction; positioning means for locating the machining element and the workpiece with the machining element adapted to contact said junction; pattern means rotated simultaneously with the workspindle and determinative of the desired contour of the first surface and of the profile of the second surface; tracer means influenced by the pattern means for guiding the machining element and the workpiece relative to each other in the two directions above-mentioned; and an orientation control for oscillating the machining element relative to the workpiece, the tracer means and the orientation control maintaining the machining surface substantially tangential to the second surface at the junction when in contact with the junction.

5. A machine tool for machining on a workpiece a first surface and a second surface which is inclined relative to the first surface, comprising a rotary disc-like machining element having a peripheral machining surface complementary to the desired configuration of the junction between the first and second surfaces; means supporting the workpiece and the machining element in operative relationship and including a workspindle for rotating the workpiece and a support permitting movement of the machining element and the workpiece relative to each other in a direction substantially parallel to the axis of rotation of the workspindle and also in a direction substantially normal to the axis of rotation of the workspindle; a contour control for guiding the machining element and the workpiece relative to each other in the direction substantially parallel to the axis of rotation of the workspindle and including a first pattern rotated synchronously with the workspindle and determinative of the desired contour of the first surface and a first follower cooperating with the pattern; positioning means for locating the machining element and the workpiece with the machining element adapted to contact said junction; a profile control for guiding the machining element and the workpiece relative to each other in the direction substantially normal to the axis of rotation and including a second pattern rotated synchronously with the workspindle and determinative of the profile of the second surface and a second follower cooperating with the second pattern; and an orientation control for synchronously oscillating the first follower and the machining element relative to the first pattern and the first surface respectively, the profile control and the orientation control maintaining the machining surface of the machining element substantially tangential to the second surface at the junction when machining the junction.

6. A machine tool for machining on a workpiece a first surface and the junction between the first surface and a second surface which is inclined relative to the first surface, comprising a rotary disc-like machining element having a peripheral machining surface complementary to the desired configuration of the junction between the first and second surfaces; means supporting the workpiece and the machining element in operative relationship and including a workspindle for rotating the workpiece and a support permitting movement of the machining element and the workpiece relative to each other in a direction substantially parallel to the axis of rotation of the workpiece and also in another direction substantially normal to the axis of rotation of the workspindle; a contour control for guiding the machining element and the workpiece relative to each other in the direction substantially parallel to the axis of rotation of the workspindle and including a pattern rotated simultaneously with the workspindle and determinative of the desired contour of the first surface and a tracer controlled by the pattern; a feed for moving the machining element over the first surface in said other direction substantially normal to the axis of rotation of the workspindle; a profile control determinative of the profile of the second surface for guiding the machining element and the workpiece relative to each other in said other direction for machining said junction; and an orientation control for oscillating the machining element relative to the workpiece, the profile control and the orientation control maintaining the machining surface substantially tangential to the second surface at the junction when machining the junction.

7. A machine tool for machining on a workpiece a first surface and the junction between the first surface and a second surface which is inclined relative to the first surface, comprising a rotary disc-like machining element having a peripheral machining surface complementary to the desired configuration of the junction between the first and second surfaces; means supporting the workpiece and the machining element in operative relationship and including a workspindle for rotating the workpiece and a support permitting movement of the machining element and the workpiece relative to each other in a direction substantially parallel to the axis of rotation of the workspindle and also in another direction; a drive for the workspindle; a contour control for guiding the machining element and the workpiece relative to each other in the direction substantially parallel to the axis of rotation of the workspindle and including a pattern driven simultaneously with the workspindle by the drive and determinative of the desired contour of the first surface and a tracer controlled by the pattern; positioning means for locating the machining element and the workpiece with the machining element adapted to contact said junction; a profile control determinative of the profile of the second surface for guiding the machining element and the workpiece relative to each other in said other direction for machining said junction; an orientation control for oscillating the machining element relaitve to the workpiece, the profile control and the orientation control maintaining the machining surface substantially tangential to the second surface at the junction when machining the junction; and a speed control for varying the speed of the drive in accordance with variations in the profile of the second surface.

8. A machine tool for machining on a workpiece a first surface and the junction between the first surface and a second surface which is inclined relative to the first surface, comprising a workspindle for rotating the workpiece; a machining unit having a rotary disc-like machining element, said element having a peripheral machining surface complementary to the desired configuration of the junction between the first and second surfaces; a support on which the machining unit is pivotally mounted, the support being movable in a direction substantially parallel to the axis of rotation of the workspindle and also in another direction to move the machining element over the workpiece; a contour control for guiding the support in the direction substantially parallel to the axis of rotation of the workspindle and including a pattern rotated synchronously with the workspindle and determinative of the desired contour of the first surface and a follower unit cooperating with the pattern and pivotally mounted on the support; positioning means for locating the support with machining surface of the machining element adapted to contact said junction; a profile control determinative of the profile of the second surface for guiding the support in said other direction; and an orientation control for synchronously pivoting the follower unit and the machining unit on the support to oscillate the follower unit and the machining element in curved paths over the pattern and the first surface respectively, the oscillations of the follower unit and the machining element being of constant period and amplitude.

9. A machine tool for machining on a workpiece a first surface, a second surface protruding from and inclined relative to the first surface and the junction between the first and second surfaces, comprising a workspindle for rotating the workpiece; a rotary disc-like machining element having a peripheral machining surface complementary to the desired configuration of the junction between the first and second surfaces; a support for the machining element movable in a direction substantially parallel to the axis of rotation of the workspindle and also in another direction to move the machining element over the workpiece; a contour control for guiding the support in the direction substantially parallel to the axis of rotation of the workspindle and including a first pattern on the workspindle and determinative of the desired contour of the first surface and a first follower mounted on the support and cooperating with the first pattern; positioning means for locating the support with the machining surface of the machining element adapted to contact said junction; a profile control for guiding the support in said other direction and including a second pattern on the workspindle and determinative of the desired profile of the second surface and a second follower mounted on the support and cooperating with the second pattern; a drive for moving the support for the machining element in the direction substantially parallel to the axis of rotation of the workspindle for machining the second surface; and an orientation control for synchronously oscillating the first follower and the machining element relative to the first pattern and the second surface respectively, the profile control and the orientation control maintaining the machining surface substantially tangential to the second surface at the junction when in contact with the junction.

10. A multi-spindle machine tool for machining on each of a plurality of workpieces a first surface, a second surface protruding from and inclined relative to the first surface and the junction between the first and second surfaces, the machine tool comprising a base; a hub rotatably mounted on the base; a profile pattern determinative of the profile of the second surface and rotatable coaxially with the hub; a plurality of workspindles spaced around and journalled upon the hub for the rotation of the workpieces; a plurality of contour patterns determinative of the contour of the first surface and rotatable coaxially with the workspindles; and a plurality of maching stations on the base, the machining stations being spaced around the hub for machining the workpieces; a first of the machining stations having a first rotary machining element for machining the second surface of a workpiece, a support for the machining element movable in a direction substantially parallel to the axes of the workspindles and also in another direction, a drive for moving the support in the direction substantially parallel to the axes of the workspindles, and a profile follower cooperating with the profile pattern for guiding the support in said other direction; and a second of the machining stations having a second rotary disc-like machining element having a peripheral machining surface complementary to the desired configuration of the junction between the first and second surfaces for machining the first surface of a workpiece and the junction between the first and second surfaces of the workpiece, a support for the second machining element movable in the direction substantially parallel to the axes of the workspindles and also in a second direction, a contour follower cooperating with a contour pattern for guiding the support for the second machining element in the direction substantially parallel to the axes of the workspindles, positioning means for locating the support for the second machining element with the machining surface of the second machining element adapted to contact said junction, a second profile follower cooperating with the profile pattern for guiding the support for the second machining element in said second direction, and an orientation control for synchronously oscillating the contour follower and the second machining element relative to said contour pattern and said second surface respectively, the second profile control and the orientation control maintaining the machining surface of the second machining element substantially tangential to the second surface of the workpiece at the junction when in contact with the junction.

11. A machine tool for machining on a workpiece a first surface and a fillet between the first surface and a second surface which is inclined relative to the first surface, comprising a support for the workpiece; a second support; a rotary disc-like machining element mounted on the second support and movable over the first surface, the machining element having a large radius relative to the size of the fillet and having a peripheral machining surface complementary to the desired configuration of the fillet; a drive for imparting movement to the supports relative to each other; and control means for positioning the machining element and the workpiece relative to each other, said means comprising a contour control for guiding the machining element and the workpiece relative to each other for machining the first surface and including a pattern determinative of the desired contour of the first surface and a tracer controlled by the pattern; positioning means for locating the machining element and the workpiece with the machining surface of the machining element adapted to contact the fillet; a profile control determinative of the profile of the second surface for guiding the machining element and the workpiece relative to each other for machining the fillet, and an orientation control for oscillating the machining element and the workpiece relative to each other, the profile control and the orientation control maintaining the machining surface substantially tangential to the second surface at the junction when machining.

12. A machine tool for machining on a workpiece a first surface and the junction between the first surface and a second surface which is inclined relative to the first surface, comprising a workspindle for continuously rotating the workpiece in a predetermined sense of rotation about an axis generally normal to the first surface; a machining unit having a rotary disc-like machining element, said element having a peripheral machining surface complementary to the desired configuration of the junction between the first and second surfaces; a support on which the machining unit is pivotally mounted on an axis substantially parallel to the axis of rotation of the workspindle, the support being movable in a direction substantially parallel to the axis of rotation of the workspindle and also in a direction substantially normal to the axis of rotation of the workspindle, the rotary machining element having its axis of rotation inclined to the two said directions; a contour control for guiding the support in the direction substantially parallel to the axis of rotation of the workspindle and including a pattern rotated synchronously with the workspindle and determinative of the contour of the first surface and a follower unit cooperating with the pattern and pivotally mounted on the support on an axis substantially parallel to the axis of rotation of the workspindle; a profile control for guiding the support in the direction substantially normal to the axis of rotation of the workspindle and including a second pattern rotated synchronously with the workspindle and determinative of the profile of the second surface and a follower cooperating with the second pattern and mounted on the support; an orientation control for synchronously pivoting the contour follower unit and the machining unit on the support to oscillate the units in curved paths, the oscillations being of constant period and amplitude, the profile control causing the machining element to sweep tangentially to the second surface in its oscillations.

13. The method of machining on a workpiece a first surface and the junction between the first surface and a second surface which is inclined relative to the first surface, comprising moving relative to each other the workpiece and a constantly rotating disc-like cutter to subject different parts of the first surface and junction to machining by a peripheral cutting surface of the cutter, and, in addition to such movement, varying the attitude of the cutter to the workpiece, in such a way as to have the peripheral cutting surface always substantially tangential to the second surface at the junction when machining the junction.

14. The method of machining on a workpiece a first surface and the junction between the first surface and a second surface which is inclined relative to the first surface, comprising moving relative to each other the workpiece and a constantly rotating machining element to subject different parts of the first surface and junction to machining by said element, and, in addition to such movement, pivoting the workpiece and said element relative to each other thereby sweeping the element over the first surface in curved paths tangential to the second surface.

15. The method of machining on a workpiece a first surface and the junction between the first surface and a second surface which is inclined relative to the first surface, comprising moving relative to each other the workpiece and a constantly rotating machining element to subject different parts of the first surface and junction to machining by said element, and, in addition to such movement, oscillating the workpiece and said element relative to each other in arcuate sweeps of the element over the first surface and tangential to the second surface, the oscillations being of constant period and amplitude.

16. The method of machining on a workpiece a first surface and the junction between the first surface and a second surface which is inclined relative to the first surface, comprising continuously rotating the workpiece in a predetermined sense of rotation past a constantly rotating disc-like cutter to subject different parts of the first surface and junction to machining by a peripheral cutting surface of the cutter, and varying the attitude of the cutter to the workpiece in such a way as to move the peripheral cutting surface always substantially tangentially to the second surface at the junction when machining the junction.

17. The method of machining on a workpiece a first surface and the junction between the first surface and a second surface which is inclined relative to the first surface, comprising continuously rotating the workpiece in a predetermined sense of rotation past a constantly rotating disc-like cutter to subject different parts of the first surface and junction to machining by a peripheral cutting surface of the cutter, and varying the attitude of the cutter to the workpiece in such a way as to move the peripheral cutting surface always substantially tangentially to the second surface at the junction when machining the junction, while varying the speed of rotation of the workpiece in accordance with variations in the profile of the second surface.

18. The method of machining on a workpiece a first surface and the junction between the first surface and a second surface which is inclined relative to the first surface, comprising rotating the workpiece, and simultaneously sweeping a constantly rotating machining element over the first surface in curved paths tangential to the second surface.

19. The method of machining on a workpiece a first surface and the junction between the first surface and a second surface which is inclined relative to the first surface, comprising rotating the workpiece, and simultaneously oscillating a constantly rotating machining element over the first surface in arcuate sweeps tangential to the second surface.

20. The method of machining on a workpiece a first surface and the junction between the first surface and a second surface which is inclined relative to the first surface, comprising continuously rotating the workpiece in a predetermined sense of rotation about an axis generally normal to the first surface, and simultaneously oscillating a constantly rotating disc-like machining element over the first surface in arcuate sweeps tangential to the second surface.

21. The method of machining on a workpiece a first surface and the junction between the first surface and a second surface which is inclined relative to the first surface, comprising continuously rotating the workpiece in a predetermined sense of rotation about an axis generally normal to the first surface, and simultaneously oscillating a constantly rotating disc-like machining element over the first surface in arcuate sweeps tangential to the second surface, the oscillations being about a pivotal axis substantially parallel to the axis of rotation of the workpiece.

22. The method of machining on a workpiece a first surface and the junction between the first surface and a second surface which is inclined relative to the first surface, comprising continuously rotating the workpiece in a predetermined sense of rotation about an axis generally normal to the first surface, and simultaneously oscillating a constantly rotating disc-like machining element over the first surface in arcuate sweeps tangential to the second surface, while moving the machining element, during its oscillations, in a direction generally normal to the first surface in conformity with the desired contour of the first surface, the oscillations being about a pivotal axis substantially parallel to the axis of rotation of the workpiece.

23. The method of machining on a workpiece a first surface and the junction between the first surface and a second surface which is inclined relative to the first surface, comprising continuously rotating the workpiece in a predetermined sense of rotation about an axis generally normal to the first surface, and simultaneously oscillating a constantly rotating disc-like machining element over the first surface in arcuate sweeps tangential to the first surface while moving the machining element, during its oscillations, in a direction substantially parallel to the axis of rotation of the workpiece in conformity with the desired contour of the first surface, the axis of rotation of the constantly rotating machining element being inclined to both the first and the second surfaces, and the oscillations of the machining element being about a pivotal axis substantially parallel to the axis of rotation of the workpiece.

References Cited in the file of this patent

UNITED STATES PATENTS

| | | |
|---|---|---|
| 2,086,915 | Kopp | July 13, 1937 |
| 2,318,865 | Johnson | May 11, 1943 |
| 2,559,575 | Fryklund et al. | July 3, 1951 |

FOREIGN PATENTS

| | | |
|---|---|---|
| 430,102 | Great Britain | Aug. 1, 1934 |
| 650,279 | Great Britain | Feb. 21, 1951 |